(12) United States Patent
Liu et al.

(10) Patent No.: US 10,497,912 B2
(45) Date of Patent: Dec. 3, 2019

(54) WELDINGLESS CYLINDRICAL BATTERY PACK DEVICE

(71) Applicant: STONE ENERGY TECHNOLOGY CORPORATION, New Taipei (TW)

(72) Inventors: Chin-Chuan Liu, Kaohsiung (TW); Li-Ho Yao, Taipei (TW)

(73) Assignee: Stone Energy Technology Corporation, New Taipei (TW)

( * ) Notice: Subject to any disclaimer, the term of this patent is extended or adjusted under 35 U.S.C. 154(b) by 259 days.

(21) Appl. No.: 15/587,726

(22) Filed: May 5, 2017

(65) Prior Publication Data
US 2018/0130981 A1    May 10, 2018

(30) Foreign Application Priority Data
Nov. 8, 2016  (TW) .............................. 105136188 A

(51) Int. Cl.
*H01M 6/42* (2006.01)
*H01M 2/10* (2006.01)
*H01M 2/20* (2006.01)

(52) U.S. Cl.
CPC ......... *H01M 2/1077* (2013.01); *H01M 2/206* (2013.01); *H01M 2220/20* (2013.01)

(58) Field of Classification Search
CPC . H01M 2/1077; H01M 2/206; H01M 2220/20
See application file for complete search history.

(56) References Cited

U.S. PATENT DOCUMENTS

2011/0177373 A1* 7/2011 Pellenc ................. H01M 2/105
                                                                429/120

FOREIGN PATENT DOCUMENTS

| JP | 2011249243 A | 12/2011 |
|---|---|---|
| KR | 1020100071055 A | 6/2010 |
| KR | 1020140128844 A | 11/2014 |
| TW | I308406 B | 4/2009 |

* cited by examiner

*Primary Examiner* — Jane J Rhee
(74) *Attorney, Agent, or Firm* — Rosenberg, Klein & Lee

(57) ABSTRACT

A weldingless cylindrical battery pack device has a first lid body, a second lid body, multiple cylindrical batteries, multiple screwing elements, a first elastic piece, and a second elastic piece. The cylindrical batteries are mounted between the first lid body and the second lid body. The first lid body and the second lid body are screwed together by the screwing elements. Further, the first elastic piece is electronically connected to positive electrodes of the cylindrical batteries, and the second elastic piece is electronically connected to negative electrodes of the cylindrical batteries. The cylindrical batteries do not need to be welded, and the weldingless cylindrical battery pack device may be easily and quickly manufactured.

14 Claims, 12 Drawing Sheets

WELDINGLESS CYLINDRICAL BATTERY PACK DEVICE

CROSS-REFERENCE TO RELATED APPLICATIONS

This application claims the priority benefit of TW application serial No. 105136188, filed on Nov. 8, 2016. The entirety of the above-mentioned patent application is hereby incorporated by reference herein and made a part of specification.

BACKGROUND OF THE INVENTION

1. Field of the Invention

The present invention relates to a battery device, and particularly to a weldingless cylindrical battery pack device.

2. Description of the Related Art

Automobile systems have used electricity power to be the power source for many years. An electricity power supply device of the automobile system may be a rechargeable battery pack having a plurality of small rechargeable batteries or just a large single rechargeable battery. The rechargeable battery pack or the large single rechargeable battery may have defects.

For example, the rechargeable battery pack consists of the small rechargeable batteries. Since each one of the small rechargeable batteries has a respective weight and a respective volume, the total weight and total volume of the rechargeable battery pack may not be neglected. When the rechargeable battery pack is applied to the automobile system, the weight and the volume of the rechargeable battery pack may become a burden to the automobile system.

Since a manufacturing technique of the large single rechargeable battery is more complicated than a conventional battery, complexity of the large single rechargeable battery may increase with volume of the large single rechargeable battery, and safety of the large single rechargeable battery may be decreased. Therefore, the greater the volume of the large single rechargeable battery is, the higher the probability of explosion of the large single rechargeable battery is. When the large single rechargeable battery is applied to the automobile system, the danger and the damage of the large single rechargeable battery may not be ignored.

With reference to FIG. 12, a conventional battery pack 30 consists of a plurality of batteries 31. The batteries 31 are arranged as a matrix, and are electronically connected in parallel and in series to form a web electronic connection. The battery pack 30 comprises a plurality of conductive bodies 32. The conductive bodies 32 of the battery pack 30 may be electronically connected to positive electrodes and negative electrodes of the batteries 31. Therefore, the batteries 31 may be electronically connected in parallel or in series through the conductive bodies 32.

The batteries 31 of the battery pack 30 are welded to the positive electrodes and the negative electrodes of the batteries 31 to be electronically connected with the positive electrodes and the negative electrodes of the batteries 31. Since the battery pack 30 comprises many batteries 31, welding the conductive bodies 32 at the positive electrodes and the negative electrodes of the batteries may be more difficult, and may take much time to manufacture the battery pack 30.

Further, when some of the batteries 31 of the battery pack 30 are broken, the battery pack 30 may not be normally used. The batteries 31 that are broken may be disconnected from the conductive bodies 32 for replacement. Since the batteries 31 and the conductive bodies 32 are welded, the batteries 31 that are broken are difficult to be disconnected from the conductive bodies 32. Further, solutions for welding may be difficult and complicated, and cost for recycling the batteries 31 that are not broken is higher than cost for manufacturing a new battery pack 30. Therefore, the battery pack 30 having some broken batteries 31 may be discarded, and discarding the battery pack 30 having some broken batteries 31 may be very unfriendly to the environment.

Therefore, the battery pack 30 may be improved.

SUMMARY OF THE INVENTION

An objective of the present invention is to provide a weldingless cylindrical battery pack device without welding a conductive body at a battery, and the manufacturing process of the weldingless cylindrical battery pack device may be simplified.

To achieve the foregoing objective, the weldingless cylindrical battery pack device comprises a first lid body, a second lid body, a plurality of cylindrical batteries, a plurality of screwing elements, a first elastic piece, and a second elastic piece.

The first lid body comprises a first plate, a first surrounding wall, and a plurality of first connecting pillars. The first plate has a plurality of first through holes. The first surrounding wall is mounted around an edge of the first plate, and the first surrounding wall has a plurality of first insertion holes. The first connecting pillars are mounted on the first plate, and the first connecting pillars each respectively correspond to the first through holes. Each one of the first connecting pillars has a first screwing hole, and the first screwing holes are formed through the first connecting pillars. Further, the first screwing holes of the first connecting pillars each respectively communicate with the first through holes.

The second lid body comprises a second plate, a second surrounding wall, and a plurality of second connecting pillars. The second surrounding wall is mounted around an edge of the second plate, and the second surrounding wall has a plurality of second insertion holes. The second connecting pillars are mounted on the second plate, and each one of the second connecting pillars has a second screwing hole. Ends of the second connecting pillars are each respectively connected to ends of the first connecting pillars, and further the second screwing holes of the second connecting pillars each respectively communicate with the first screwing holes of the first connecting pillars.

The cylindrical batteries are mounted between the first lid body and the second lid body, and each one of the cylindrical batteries comprises a positive electrode and a negative electrode. The positive electrodes of the cylindrical batteries face the first plate of the first lid body, and the negative electrodes of the cylindrical batteries face the second plated of the second lid body.

The screwing elements are each respectively mounted through the first through holes of the first lid body, and the screwing elements are each screwed into the first screwing holes of the first lid body and the second screwing holes of the second lid body.

The first elastic piece comprises a first connecting part and a plurality of first conductive bars. The first conductive bars are formed on an edge of the first connecting part, and the first conductive bars are respectively inserted into the first insertion holes of the first surrounding wall of the first lid body. The first conductive bars are electronically connected to the positive electrodes of the cylindrical batteries.

The second elastic piece comprises a second connecting part and a plurality of second conductive bars. The second conductive bars are formed on an edge of the second connecting part, and the second conductive bars are respectively inserted into the second insertion holes of the second surrounding wall of the second lid body. The second conductive bars are electronically connected to the negative electrodes of the cylindrical batteries.

Besides, the present invention provides another weldingless cylindrical battery pack device, and the weldingless cylindrical battery pack device comprises a third lid body, a fourth lid body, a plurality of third cylindrical batteries, a plurality of fourth cylindrical batteries, a plurality of screwing elements, a third elastic piece, a fourth elastic piece, and a fifth elastic piece.

The third lid body comprises a third plate, a third surrounding wall, and a plurality of third connecting pillars. The third plate has a plurality of third through holes. The third surrounding wall is mounted around an edge of the third plate, and the third surrounding wall has a plurality of third insertion holes. The third connecting pillars are mounted on the third plate, and the third connecting pillars are each respectively corresponding to the third through holes. Each one of the third connecting pillars has a third screwing hole, and the third screwing holes are formed through the third connecting pillars. Further, the third screwing holes of the third connecting pillars each respectively communicate with the third through holes.

The fourth lid body comprises a fourth plate, a fourth surrounding wall, and a plurality of fourth connecting pillars. The fourth surrounding wall is mounted around an edge of the fourth plate, and the fourth surrounding wall has a plurality of fourth insertion holes. The fourth connecting pillars are mounted on the fourth plate, and each one of the fourth connecting pillars has a fourth screwing hole. Ends of the fourth connecting pillars are each respectively connected to ends of the third connecting pillars, and further the fourth screwing holes of the fourth connecting pillars each respectively communicate with the third screwing holes of the third connecting pillars.

The third cylindrical batteries are mounted between the third lid body and the fourth lid body, and each one of the third cylindrical batteries comprises a positive electrode and a negative electrode. The positive electrodes of the third cylindrical batteries face the third plate of the third lid body, and the negative electrodes of the third cylindrical batteries face the fourth plate of the fourth lid body.

The fourth cylindrical batteries are mounted between the third lid body and the fourth lid body, and each one of the fourth cylindrical batteries comprises a positive electrode and a negative electrode. The negative electrodes of the fourth cylindrical batteries face the third plate of the third lid body, and the positive electrodes of the fourth cylindrical batteries face the fourth plate of the fourth lid body.

The screwing elements are each respectively mounted through the third through holes of the third lid body, and the screwing elements are each respectively screwed into the third screwing holes of the third lid body and the fourth screwing holes of the fourth lid body.

The third elastic piece comprises a third connecting part and a plurality of third conductive bars. The third conductive bars are formed on an edge of the third connecting part.

The fourth elastic piece comprises a fourth connecting part, a plurality of fourth negative conductive bars, and a plurality of fourth positive conductive bars. The fourth negative conductive bars and the fourth positive conductive bars are formed on an edge of the fourth connecting part. The fourth negative conductive bars and the fourth positive conductive bars are respectively inserted into the fourth insertion holes of the fourth surrounding wall of the fourth lid body. The fourth negative conductive bars are electronically connected to the negative electrodes of the third cylindrical batteries. The fourth positive conductive bars are electronically connected to the positive electrodes of the fourth cylindrical batteries.

The fifth elastic piece comprises a fifth connecting part and a plurality of fifth conductive bars. The fifth conductive bars are formed on an edge of the fifth connecting part. The third conductive bars of the third elastic piece and the fifth conductive bars of the fifth elastic piece are each respectively inserted into the third insertion holes of the third surrounding wall of the third lid body. The third conductive bars of the third elastic piece are electronically connected to the positive electrodes of the third cylindrical batteries. The fifth conductive bars of the fifth elastic piece are electronically connected to the negative electrodes of the fourth cylindrical batteries.

The cylindrical batteries of the weldingless cylindrical battery pack device are mounted between the third lid body and the fourth lid body, and the screwing elements may be each respectively screwed into the third screwing hole of the third lid body and the fourth screwing holes of the fourth lid body. Therefore, the third lid body and the fourth lid body may be screwed together by the screwing elements, and the cylindrical batteries may be fixed between the third lid body and the fourth lid body.

Further, the first elastic piece and the second elastic piece may be electronically connected to the positive electrodes of the cylindrical batteries and the negative electrodes of the cylindrical batteries. Therefore, the weldingless cylindrical battery pack device may be electronically connected to a load to provide electric power by electronically connecting the first elastic piece and the second elastic piece to the load.

Further, the cylindrical batteries may not be welded, and a manufacturer of the weldingless cylindrical battery pack device may easily manufacture the weldingless cylindrical battery pack device and time consumption during the manufacture may be reduced.

Further, the third cylindrical batteries may be electronically connected in parallel through the third elastic piece and the fourth elastic piece, and the fourth cylindrical batteries may be electronically connected in parallel through the fourth elastic piece and the fifth elastic piece. Then, the third cylindrical batteries electronically connected in parallel and the fourth cylindrical batteries electronically connected in parallel may be electronically connected in series through the fourth elastic piece. Therefore, design of the weldingless cylindrical battery pack device may be easily changed.

Other objectives, advantages and novel features of the invention will become more apparent from the following detailed description when taken in conjunction with the accompanying drawings.

DETAILED DESCRIPTION OF THE INVENTION

Figure 1:
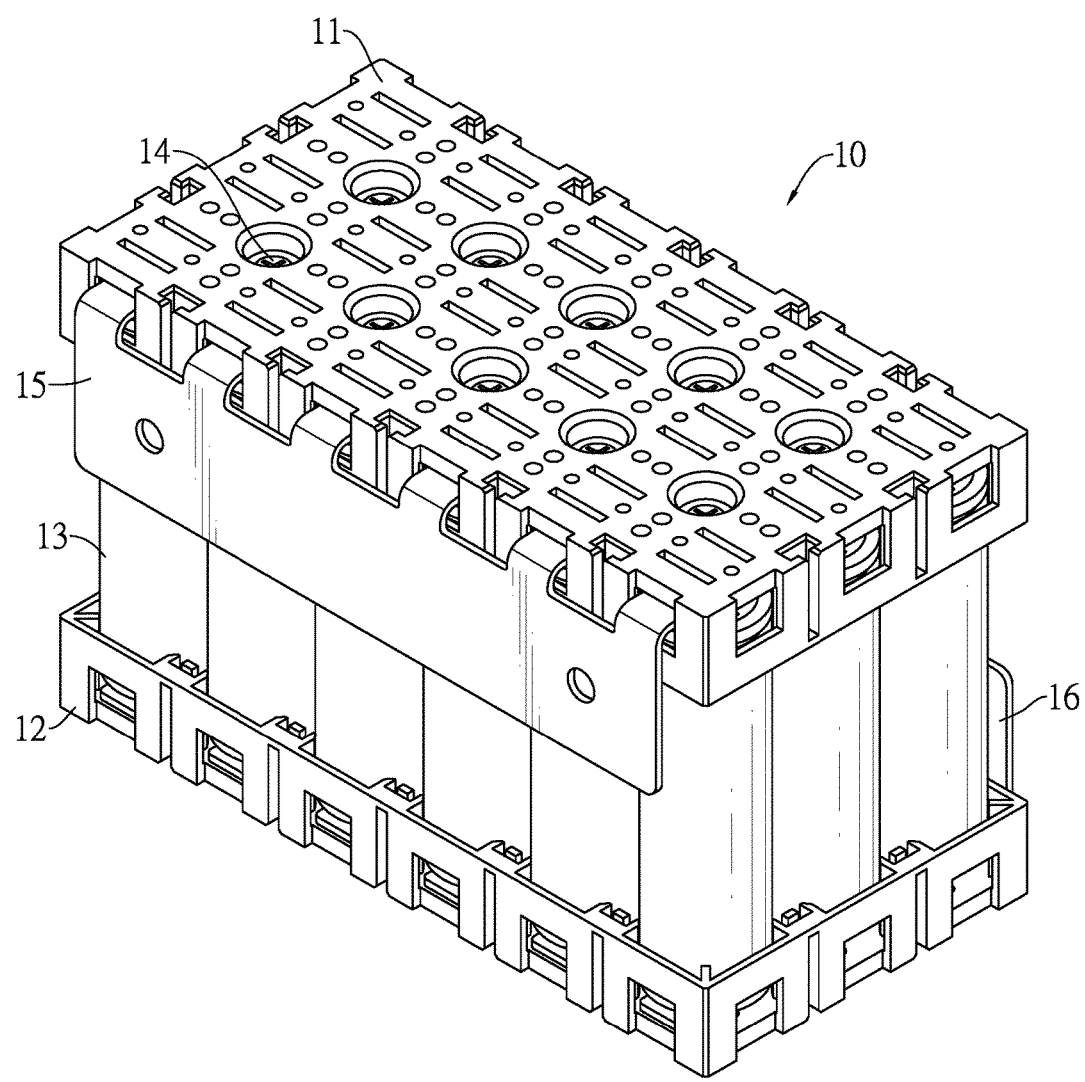
FIG. 1 is a perspective view of a first embodiment of a weldingless cylindrical battery pack device of the present application.
Figure 2:
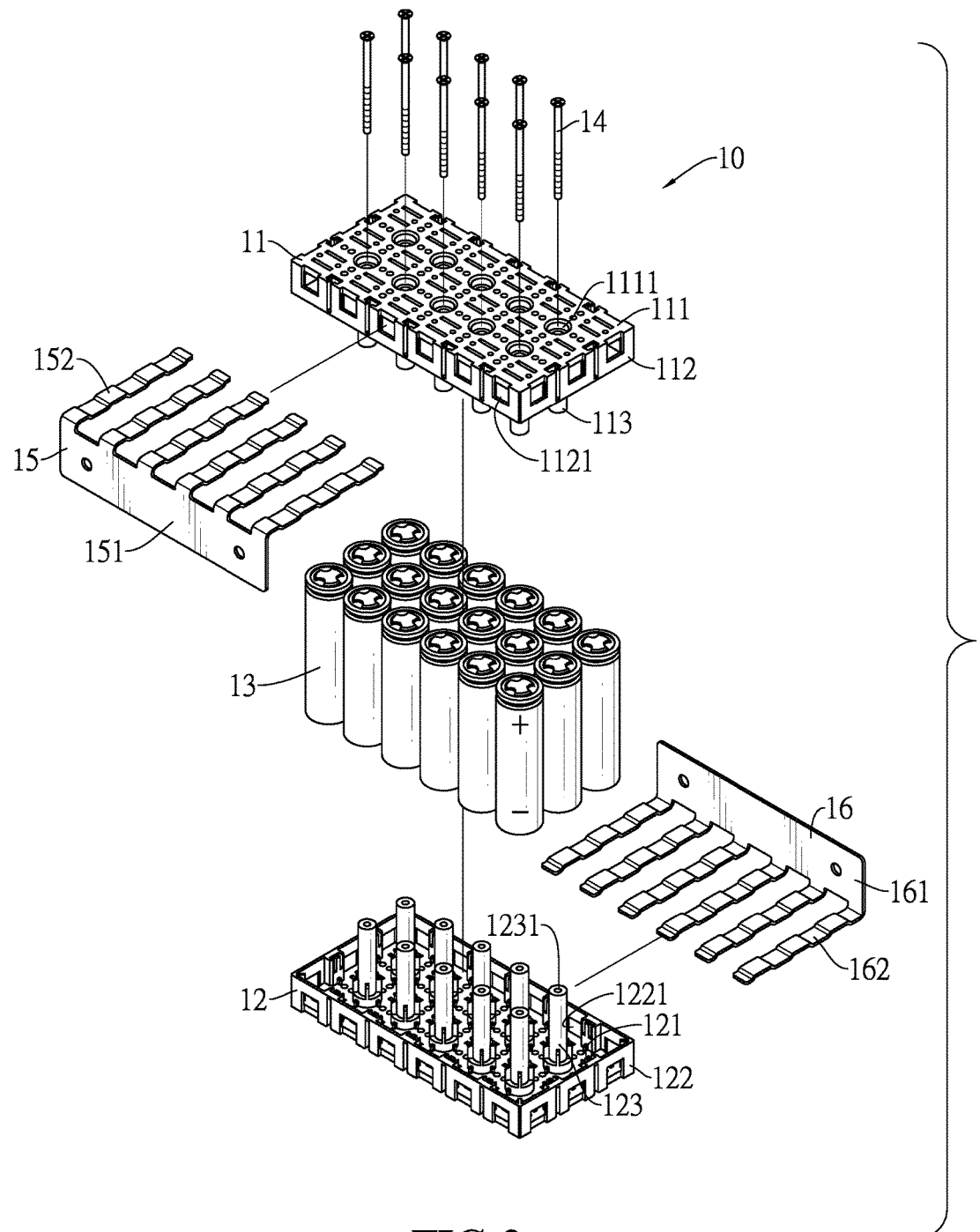
FIG. 2 is an exploded perspective view of the first embodiment of the weldingless cylindrical battery pack device of FIG. 1.

With reference to FIGS. 1 and 2, the present invention is a weldingless cylindrical battery pack device 10. A first embodiment of the weldingless cylindrical battery pack device 10 comprises a first lid body 11, a second lid body 12, a plurality of cylindrical batteries 13, a plurality of screwing elements 14, a first elastic piece 15, and a second elastic piece 16.

Figure 3:
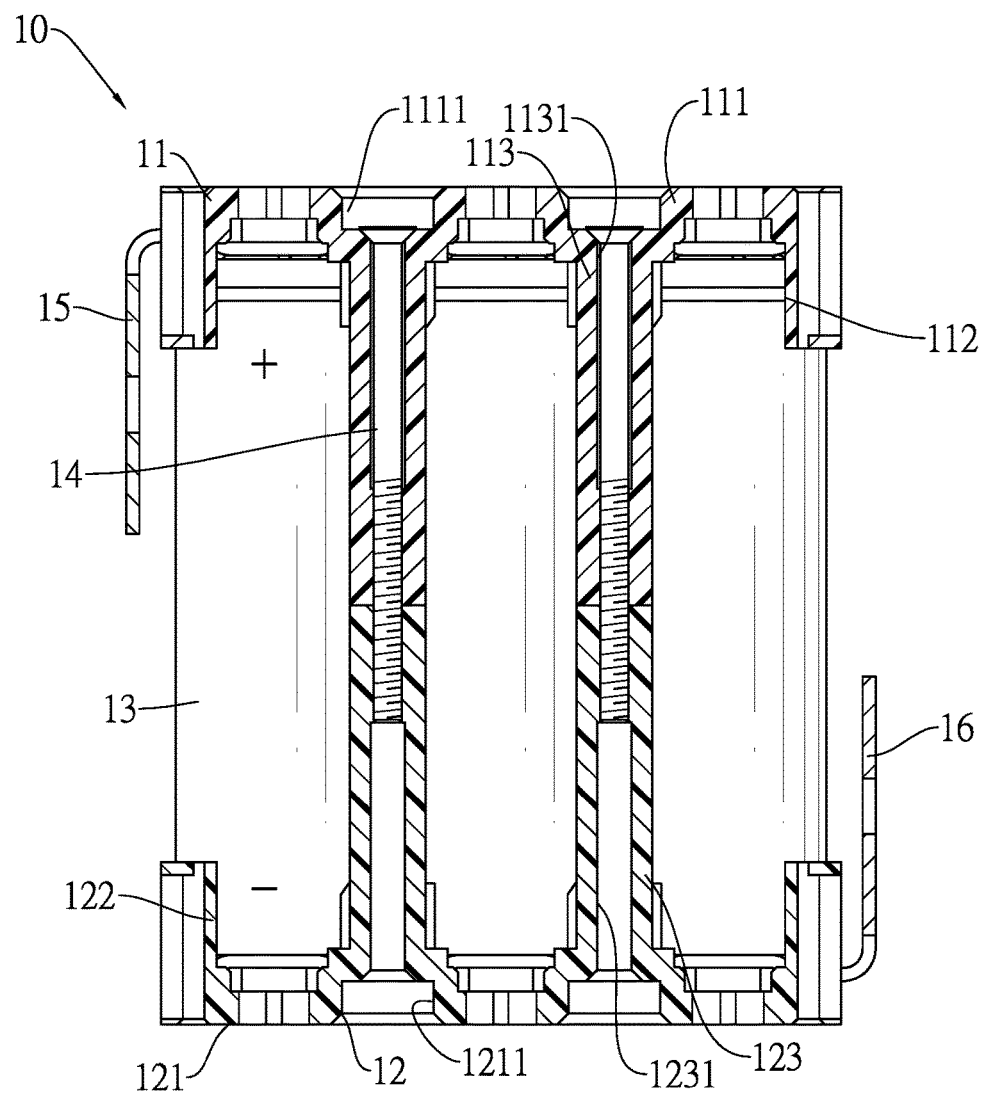
FIG. 3 is a sectional view of the first embodiment of the weldingless cylindrical battery pack device of FIG. 1.

Further with reference to FIG. 3, the first lid body 11 comprises a first plate 111, a first surrounding wall 112, and a plurality of first connecting pillars 113. The first plate 111 has a plurality of first through holes 1111. The first surrounding wall 112 is mounted around an edge of the first plate 111, and the first surrounding wall 112 has a plurality of first insertion holes 1121. The first connecting pillars 113 are mounted on the first plate 111, and the first connecting pillars 113 each respectively correspond to the first through holes 1111. Each one of the first connecting pillars 113 has a first screwing hole 1131, and the first screwing holes 1131 are formed through the first connecting pillars 113. Further, the first screwing holes 1131 of the first connecting pillars 113 each respectively communicate with the first through holes 1111.

The second lid body 12 comprises a second plate 121, a second surrounding wall 122, and a plurality of second connecting pillars 123. The second surrounding wall 122 is mounted around an edge of the second plate 121, and the second surrounding wall 122 has a plurality of second insertion holes 1221. The second connecting pillars 123 are mounted on the second plate 121, and each one of the second connecting pillars 123 has a second screwing hole 1231. Ends of the second connecting pillars 123 are each respectively connected to ends of the first connecting pillars 113, and further the second screwing holes 1231 of the second connecting pillars 123 each respectively communicate with the first screwing holes 1131 of the first connecting pillars 113.

The cylindrical batteries 13 are mounted between the first lid body 11 and the second lid body 12, and each one of the cylindrical batteries 13 comprises a positive electrode and a negative electrode. The positive electrodes of the cylindrical batteries 13 face the first plate 111 of the first lid body 11, and the negative electrodes of the cylindrical batteries 13 face the second plate 121 of the second lid body 12.

The screwing elements 14 are each respectively mounted through the first through holes 1111 of the first lid body 11, and the screwing elements are each respectively screwed into the first screwing holes 1131 of the first lid body 11 and the second screwing holes 1231 of the second lid body 12.

Figure 4:
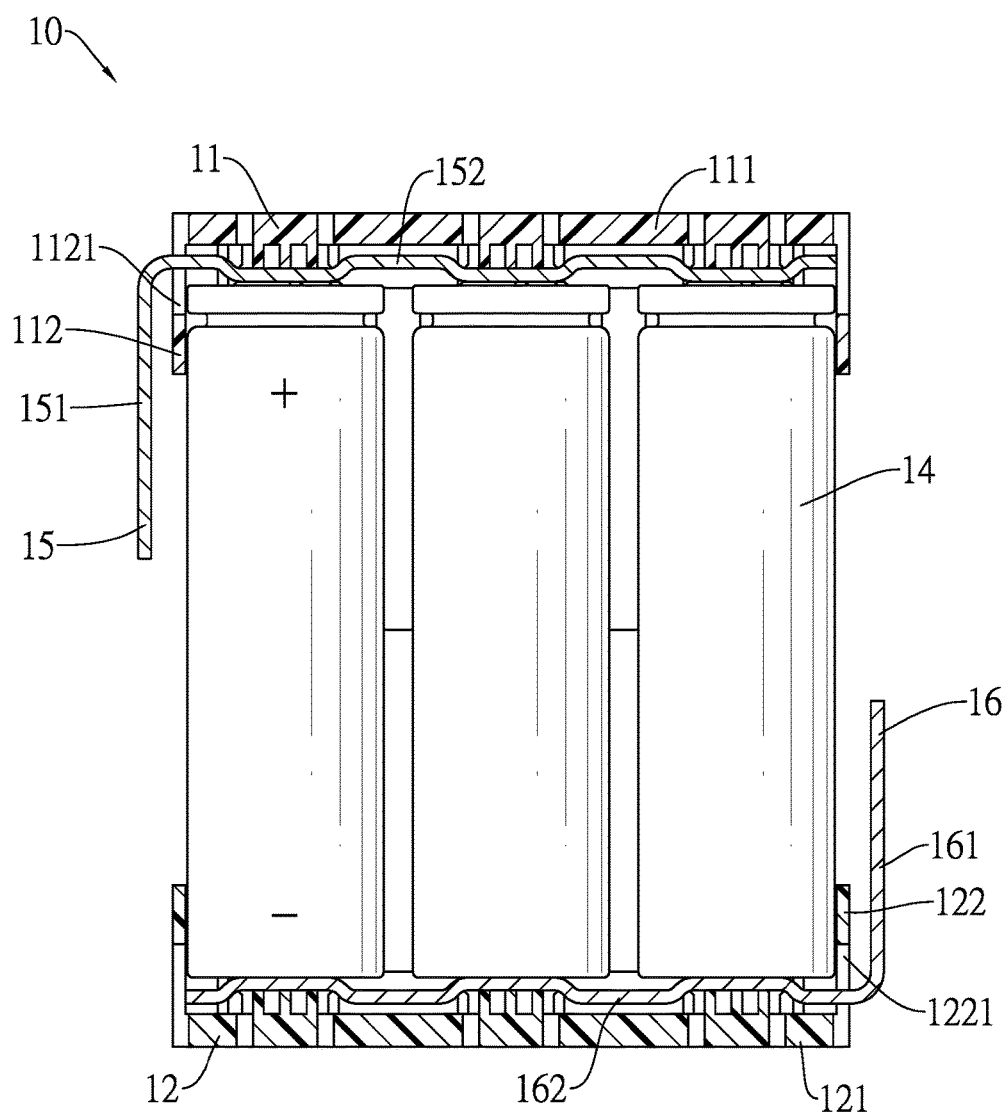
FIG. 4 is another sectional view of the first embodiment of the weldingless cylindrical battery pack device of FIG. 1.
Figure 5:
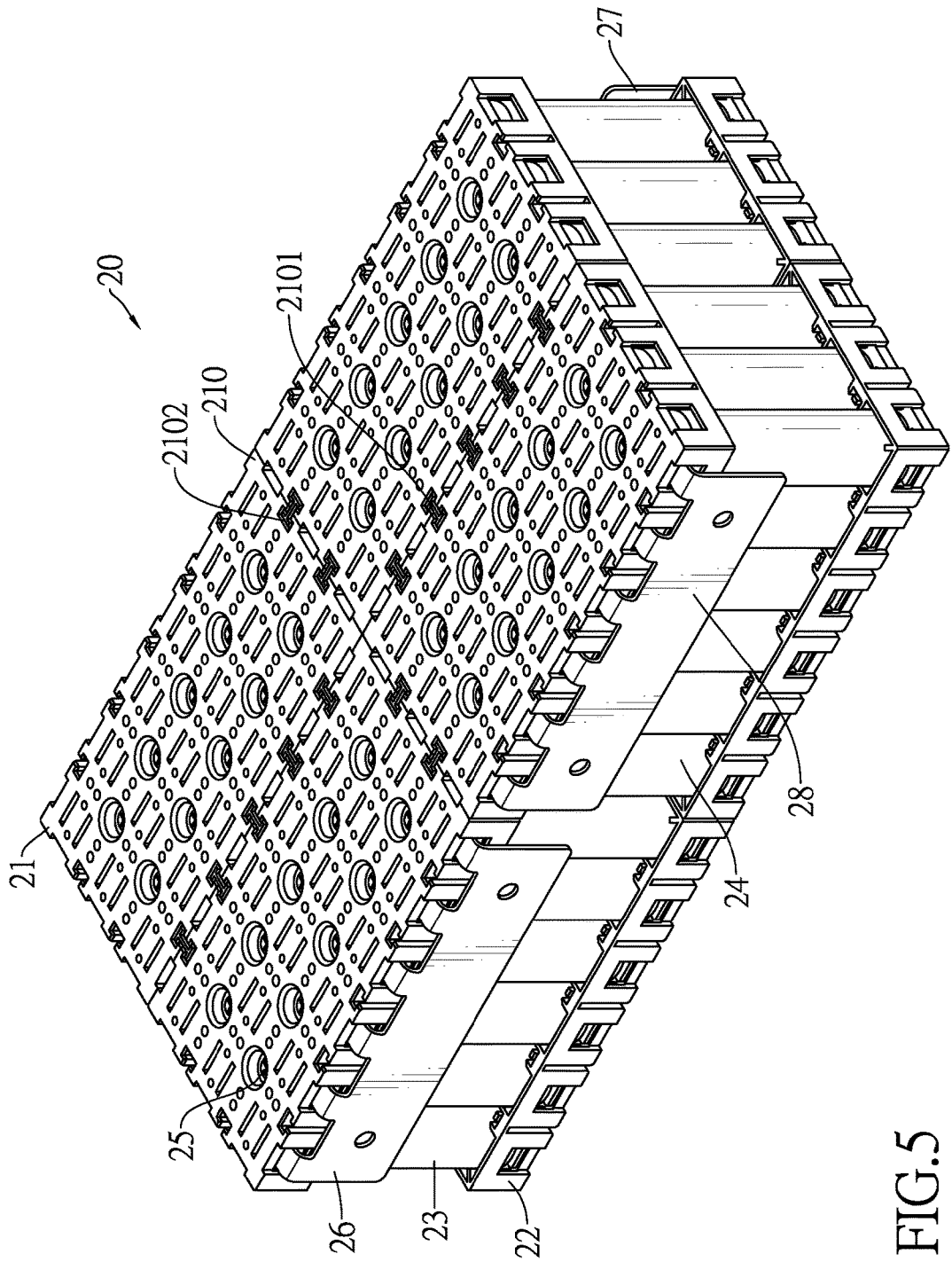
FIG. 5 is a perspective view of a second embodiment of a weldingless cylindrical battery pack device.

Further with reference to FIG. 4, the first elastic piece 15 comprises a first connecting part 151 and a plurality of first conductive bars 152. The first conductive bars 152 are formed on an edge of the first connecting part 151, and the first conductive bars 152 are each respectively inserted into the first insertion holes 1121 of the first surrounding wall 112 of the first lid body 11. The first conductive bars 152 are electronically connected to the positive electrodes of the cylindrical batteries 13.

The second elastic piece 16 comprises a second connecting part 161 and a plurality of second conductive bars 162. The second conductive bars 162 are formed on an edge of the second connecting part 161, and the second conductive bars 162 are each respectively inserted into the second insertion holes 1221 of the second surrounding wall 122 of the second lid body 12. The second conductive bars 162 are electronically connected to the negative electrodes of the cylindrical batteries 13.

The first connecting part 151 of the first elastic piece 15 may be electronically connected to the positive electrodes of the cylindrical batteries 13 through the first conductive bars 152, and then the first connecting part 151 of the first elastic piece 15 may be a positive electrode of the weldingless cylindrical battery pack device 10. Further, the second connecting part 161 of the second elastic piece 16 may be electronically connected to the negative electrodes of the cylindrical batteries 13 through the second conductive bars 162, and then the second connecting part 161 of the second elastic piece 16 may be a negative electrode of the weldingless cylindrical battery pack device 10. Therefore, the cylindrical batteries 13 may be electronically connected in parallel.

The cylindrical batteries 13 of the weldingless cylindrical battery pack device 10 are mounted between the first lid body 11 and the second lid body 12, and the screwing elements 14 may be each respectively screwed into the first screwing hole 113 of the first lid body 11 and the second screwing holes 123 of the second lid body 12. Therefore, the first lid body 11 and the second lid body 12 may be screwed together by the screwing elements 14, and the cylindrical batteries 13 may be fixed between the first lid body 11 and the second lid body 12.

Further, the first elastic piece 15 and the second elastic piece 16 may be electronically connected to the positive electrodes of the cylindrical batteries 13 and the negative electrodes of the cylindrical batteries 13. Therefore, the weldingless cylindrical battery pack device 10 may be electronically connected to a load to provide electric power by electronically connecting the first elastic piece 15 and the second elastic piece 16 to the load. Further, the cylindrical batteries 13 may not be welded, and a manufacturer of the weldingless cylindrical battery pack device 10 may easily manufacture the weldingless cylindrical battery pack device 10, and time consumption for the manufacture may be reduced.

Further, when some cylindrical batteries 13 are broken, the first elastic piece 15 and the second elastic piece 16 are pulled out from the first lid body 11 and the second lid body 12. Then, the screwing elements 14 are each respectively screwed out from the first screwing holes 1131 of the first lid body 11 and the second screwing holes 1231 of the second lid body 12. The cylindrical batteries 13 that are broken may be replaced by new cylindrical batteries. Therefore, wastes may be decreased.

Besides, the second plate 121 of the second lid body 12 comprises a plurality of second through holes 1211. The second through holes 1211 respectively communicate with the second screwing holes 1231 of the second connecting pillars 123.

Therefore, the screwing elements 14 may be each respectively screwed into the first screwing holes 1131 and the second screwing hole 1231 through the first through holes 1111 or the second through holes 1211. Then, the screwing elements 14 may be each respectively screwed into the first screwing holes 1131 and the second screwing hole 1231 from two opposite sides of the weldingless cylindrical battery pack device 10, and a manufacturer may more easily manufacture the weldingless cylindrical battery pack device 10.

With reference to FIG. 4, each one of the first conductive bars 152 of the first elastic piece 15 is a wavy structure. Wave crests or wave troughs of the first conductive bars 152 of the first elastic piece 15 may be contacted with the positive electrodes of the cylindrical batteries 13.

Each one of the second conductive bars 162 of the second elastic piece 16 is a wavy structure. Wave crests or wave troughs of the second conductive bars 162 of the second elastic piece 16 may be contacted with the negative electrodes of the cylindrical batteries 13.

Further, with reference to FIG. 2, the first through holes 1111 of the first lid body 11 are arranged as a matrix. Since the first connecting pillars 113 correspond to the first through holes 1111, the first connecting pillars 113 are also arranged as a matrix.

Ends of the second connecting pillars 123 of the second lid body 12 are each respectively connected to the ends of the first connecting pillars 113. Therefore, the second connecting pillars 123 of the second lid body 12 are also arranged as a matrix.

The cylindrical batteries 13 are arranged as a matrix, and each four adjacent cylindrical batteries 13 are around one of the second connecting pillars 123 and the connected one of the first connecting pillars 113.

Therefore, the cylindrical batteries 13 may be tightly arranged, and volume of the weldingless cylindrical battery pack device 10 may be decreased.

With reference to FIGS. 1 and 4, the first insertion holes 1121 of the first lid body 11 is formed on a position on the first surrounding wall 112 near a boundary between the first surrounding wall 112 and the first plate 111. The second insertion holes 1221 of the second lid body 12 are formed on a position on the second surrounding wall 122 near a boundary between the second surrounding wall 122 and the second plate 121.

With reference to FIGS. 5 to 11, a fourth embodiment of the weldingless cylindrical battery pack device 20 comprises a third lid body 21, a fourth lid body 22, a plurality of third cylindrical batteries 23, a plurality of fourth cylindrical batteries 24, a plurality of screwing elements 25, a third elastic piece 26, a fourth elastic piece 27, and a fifth elastic piece 28.

Figure 6:
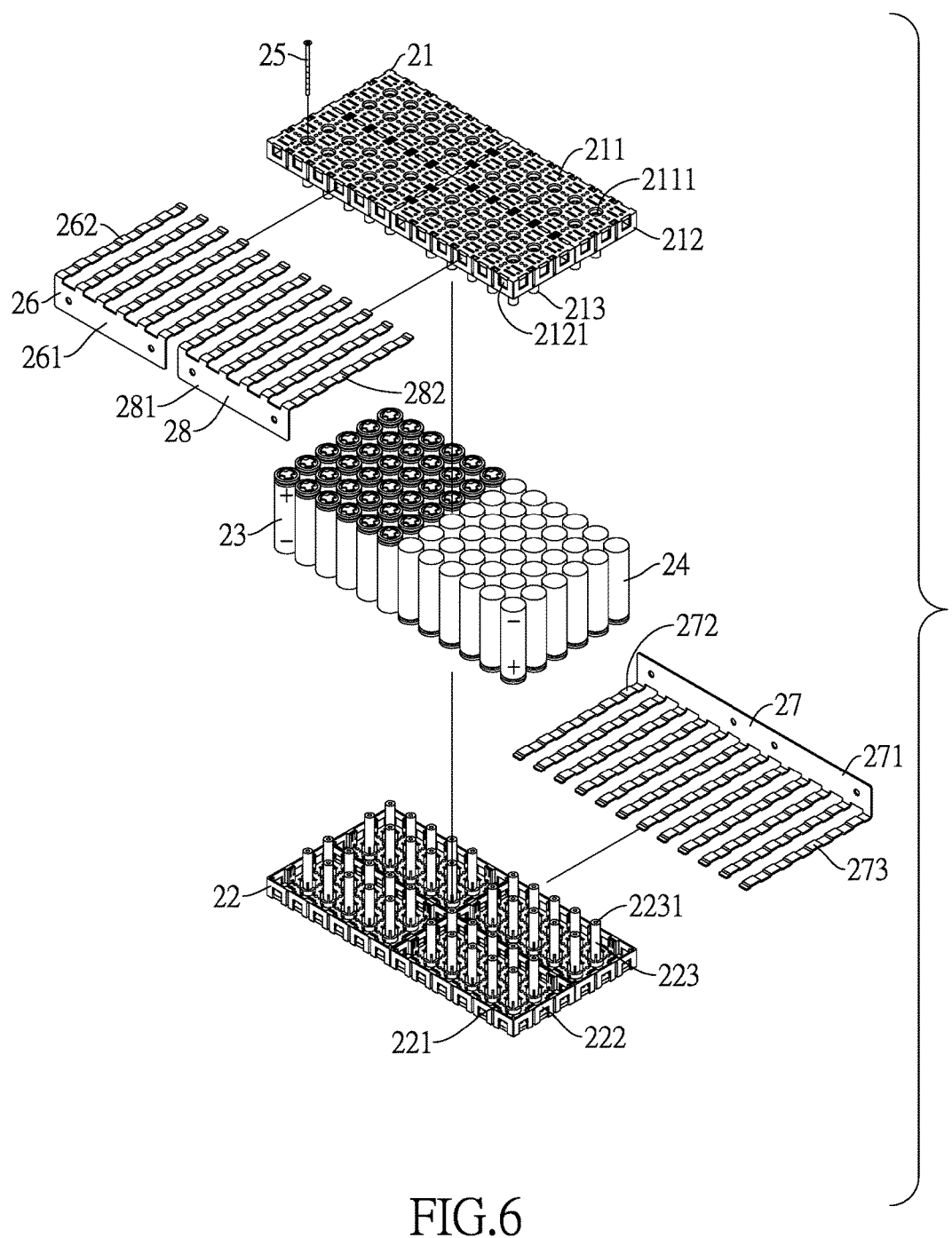
FIG. 6 is an exploded perspective view of the second embodiment of the weldingless cylindrical battery pack device of FIG. 5.
Figure 7:
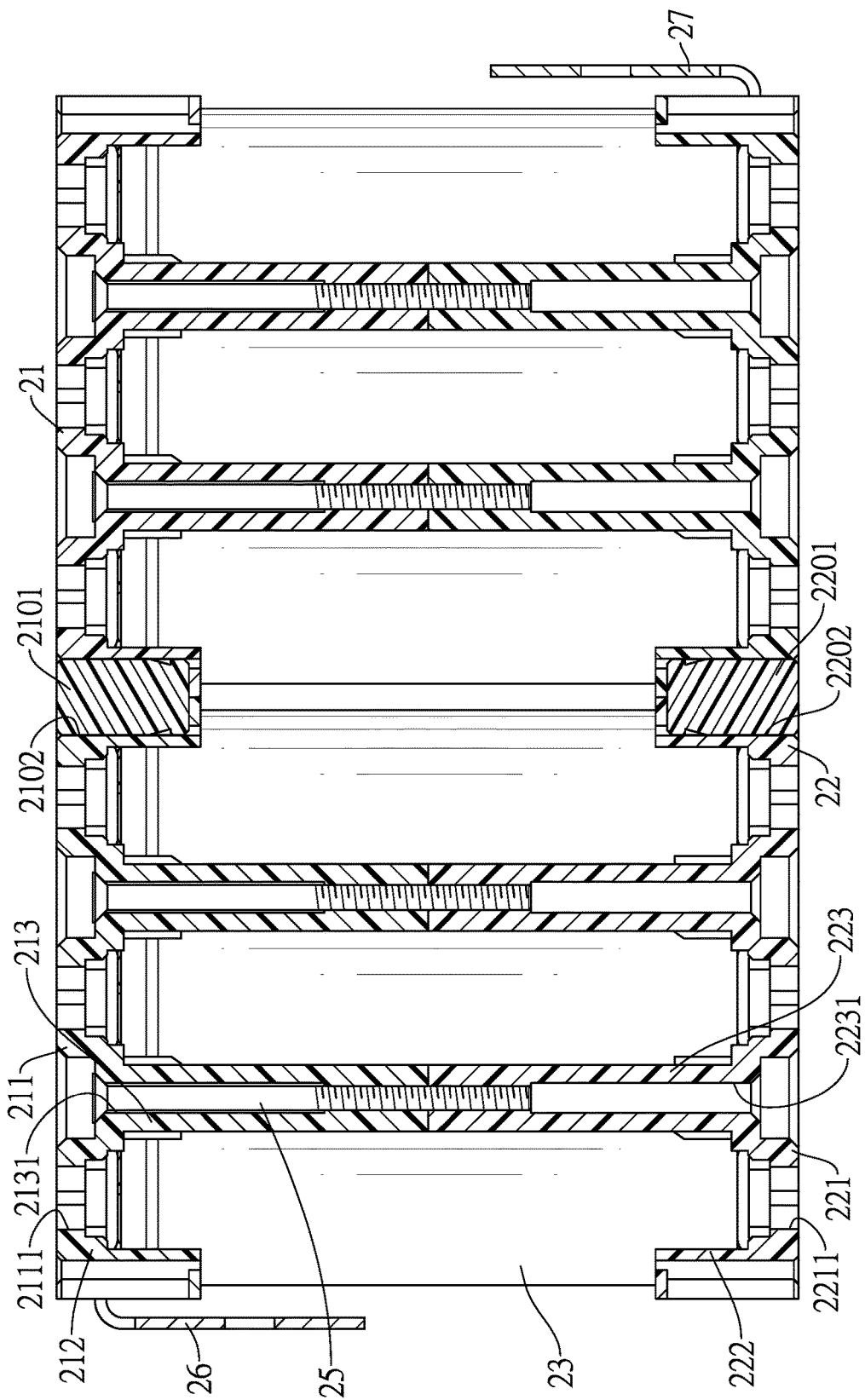
FIG. 7 is a sectional view of the second embodiment of the weldingless cylindrical battery pack device of FIG. 5.

As shown in FIGS. 6 and 7, the third lid body 21 comprises a third plate 211, a third surrounding wall 212, and a plurality of third connecting pillars 213. The third plate 211 has a plurality of third through holes 2111. The third surrounding wall 212 is mounted around an edge of the third plate 211, and the third surrounding wall 212 has a plurality of third insertion holes 2121. The third connecting pillars 213 are mounted on the third plate 211, and the third connecting pillars 213 each respectively correspond to the third through holes 2131. Each one of the third connecting pillars 213 has a third screwing hole 2131, and the third screwing holes 2131 are formed through the third connecting pillars 213. Further, the third screwing holes 2131 of the third connecting pillars 213 each respectively communicate with the third through holes 2111.

The fourth lid body 22 comprises a fourth plate 221, a fourth surrounding wall 222, and a plurality of fourth connecting pillars 223. The fourth surrounding wall 222 is mounted around an edge of the fourth plate 221, and the fourth surrounding wall 222 has a plurality of fourth insertion holes 2221. The fourth connecting pillars 223 are mounted on the fourth plate 221, and each one of the fourth connecting pillars 223 has a fourth screwing hole 2231. Ends of the fourth connecting pillars 223 are each respectively connected to ends of the third connecting pillars 213, and further the fourth screwing holes 2231 of the fourth connecting pillars 223 each respectively communicate with the third screwing holes 2131 of the third connecting pillars 213.

The third cylindrical batteries 23 are mounted between the third lid body 21 and the fourth lid body 22, and each one of the third cylindrical batteries 23 comprises a positive electrode and a negative electrode. The positive electrodes of the third cylindrical batteries 23 face the third plate 211 of the third lid body 21, and the negative electrodes of the third cylindrical batteries 23 face the fourth plate 221 of the fourth lid body 22.

The fourth cylindrical batteries 24 are mounted between the third lid body 21 and the fourth lid body 22, and each one of the fourth cylindrical batteries 24 comprises a positive electrode and a negative electrode. The negative electrodes of the fourth cylindrical batteries 24 face the third plate 211 of the third lid body 21, and the positive electrodes of the fourth cylindrical batteries 24 face the fourth plate 221 of the fourth lid body 22.

The screwing elements 25 are each respectively mounted through the third through holes 2111 of the third lid body 21, and the screwing elements 25 are each respectively screwed into the third screwing holes 2131 of the third lid body 21 and the fourth screwing holes 2231 of the fourth lid body 22.

Figure 8:
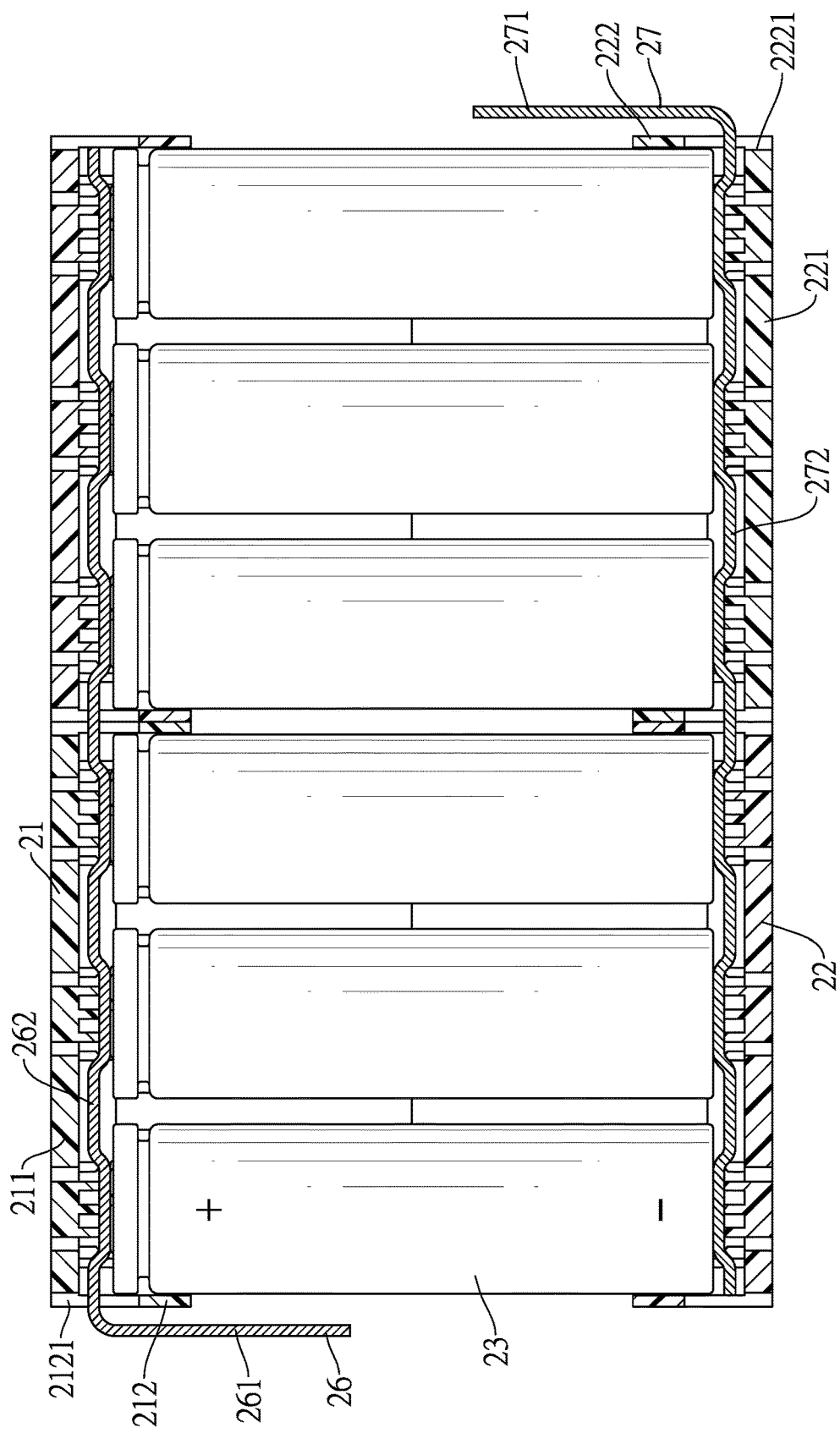
FIG. 8 is another sectional view of the second embodiment of the weldingless cylindrical battery pack device of FIG. 5.

As shown in FIGS. 6 and 8, the third elastic piece 26 comprises a third connecting part 261 and a plurality of third conductive bars 262. The third conductive bars 262 are formed on an edge of the third connecting part 261.

The fifth elastic piece 28 comprises a fifth connecting part 281 and a plurality of fifth conductive bars 282. The fifth conductive bars 282 are formed on an edge of the fifth connecting part 281. The third conductive bars 262 of the third elastic piece 26 and the fifth conductive bars 282 of the fifth elastic piece 28 are respectively inserted into the third insertion holes 2121 of the third surrounding wall 212 of the third lid body 21. The third conductive bars 262 of the third elastic piece 26 are electronically connected to the positive electrodes of the third cylindrical batteries 23. The fifth conductive bars 282 of the fifth elastic piece 28 are electronically connected to the negative electrodes of the fourth cylindrical batteries 24.

Figure 9:
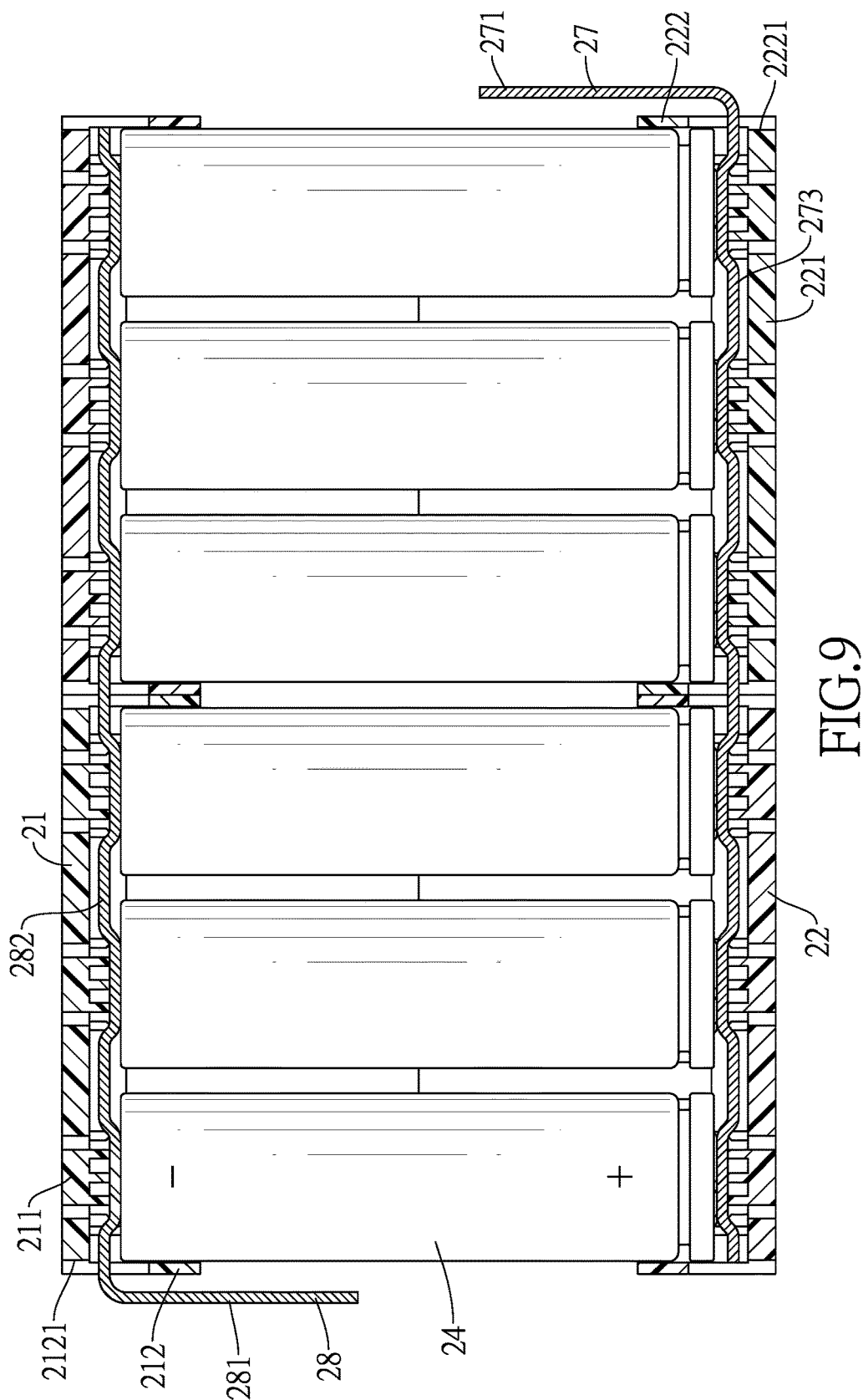
FIG. 9 is another view of the second embodiment of the weldingless cylindrical battery pack device of FIG. 5.

As shown in FIGS. 6 and 9, the fourth elastic piece 27 comprises a fourth connecting part 271, a plurality of fourth negative conductive bars 272, and a plurality of fourth positive conductive bars 273. The fourth negative conductive bars 272 and the fourth positive conductive bars 273 are formed on an edge of the fourth connecting part 271. The fourth negative conductive bars 272 and the fourth positive conductive bars 273 are respectively inserted into the fourth insertion holes 2221 of the fourth surrounding wall 222 of the fourth lid body 22. The fourth negative conductive bars 272 are electronically connected to the negative electrodes of the third cylindrical batteries 23. The fourth positive conductive bars 273 are electronically connected to the positive electrodes of the fourth cylindrical batteries 24.

The third connecting part 261 of the third elastic piece 26 may be electronically connected to the positive electrodes of the third cylindrical batteries 23 through the third conductive bars 262. The fourth connecting part 271 of the fourth elastic piece 27 may be electronically connected to the negative electrodes of the third cylindrical batteries 23 through the fourth negative conductive bars 272. Therefore, the third cylindrical batteries 23 may be electronically connected in parallel, and the third connecting part 261 of the third elastic piece 26 may be a positive electrode of the weldingless cylindrical battery pack device 20.

Further, the fourth connecting part 271 of the fourth elastic piece 27 may be electronically connected to the positive electrodes of the fourth cylindrical batteries 24 through the fourth positive conductive bars 273. The fifth connecting part 281 of the fifth elastic piece 28 may be electronically connected to the negative electrodes of the fourth cylindrical batteries 24 through the fifth conductive bars 282.

Therefore, the fourth cylindrical batteries 24 may be electronically connected in parallel. Then, the third cylindrical batteries 23 electronically connected in parallel and the fourth cylindrical batteries 24 electronically connected in parallel may be electronically connected in series. Further, the fifth connecting part 281 of the fifth elastic piece 28 may be a negative electrode of the weldingless cylindrical battery pack device 20.

Since the third cylindrical batteries 23 electronically connected in parallel and the fourth cylindrical batteries 24 electronically connected in parallel may be electronically connected in series, the weldingless cylindrical battery pack device 20 may output electric power with a voltage different from the voltage provided by the third cylindrical batteries 23 or the fourth cylindrical batteries 24. The weldingless cylindrical battery pack device 20 may further output electric power with a voltage added by the voltage provided by the third cylindrical batteries 23 and the voltage provided by the fourth cylindrical batteries 24.

Besides, the fourth plate 221 of the fourth lid body 22 comprises a plurality of fourth through holes 2211. The fourth through holes 2211 respectively communicate with the fourth screwing holes 2231 of the fourth connecting pillars 223.

Therefore, the screwing elements 25 may be each respectively screwed into the third screwing hole 2131 and the fourth screwing hole 2231 through the third through holes 2111 or the fourth through holes 2211. Then, the screwing elements 25 may be each respectively screwed into the third screwing hole 2131 and the fourth screwing hole 2231 from two opposite sides of the weldingless cylindrical battery pack device 20, and a manufacturer may more easily manufacture the weldingless cylindrical battery pack device 20.

As shown in FIG. 7, each one of the third conductive bars 262 of the third elastic piece 26 is a wavy structure. Wave crests or wave troughs of the third conductive bars 262 of the third elastic piece 26 may be contacted with the positive electrodes of the third cylindrical batteries 23.

Each one of the fourth negative conductive bars 272 of the fourth elastic piece 27 is a wavy structure. Wave crests or wave troughs of the fourth negative conductive bars 272 of the fourth elastic piece 27 may be contacted with the negative electrodes of the third cylindrical batteries 23.

As shown in FIG. 8, each one of the fourth positive conductive bars 273 of the fourth elastic piece 27 is a wavy structure. Wave crests or wave troughs of the fourth positive conductive bars 273 of the fourth elastic piece 27 may be contacted with the positive electrodes of the fourth cylindrical batteries 24.

Each one of the fifth conductive bars 282 of the fifth elastic piece 28 is a wavy structure. Wave crests or wave troughs of the fifth conductive bars 282 of the fifth elastic piece 28 may be contacted with the negative electrodes of the fourth cylindrical batteries 24.

Further, as shown in FIG. 6, the third through holes 2111 of the third lid body 21 are arranged as a matrix. Since the third connecting pillars 213 correspond to the third through holes 2111, the third connecting pillars 213 are also arranged as a matrix.

The ends of the fourth connecting pillars 223 of the fourth lid body 22 are each respectively connected to the ends of the third connecting pillars 213. Therefore, the fourth connecting pillars 223 of the fourth lid body 22 are also arranged as a matrix.

The third cylindrical batteries 23 and the fourth cylindrical batteries 24 are arranged as a matrix, and each four adjacent third cylindrical batteries 23 or the fourth cylindrical batteries 24 are around one of the fourth connecting pillars 223 and the connected one of the third connecting pillars 213.

Therefore, the third cylindrical batteries 23 and the fourth cylindrical batteries 24 may be densely arranged, and volume of the weldingless cylindrical battery pack device 20 may be decreased.

With reference to FIGS. 6, 7 and 8, the third insertion holes 2121 of the third lid body 21 is formed on a position on the third surrounding wall 212 near a boundary between the third surrounding wall 212 and the third plate 211. The fourth insertion holes 2221 of the fourth lid body 22 is formed on a position on the fourth surrounding wall 222 near a boundary between the fourth surrounding wall 222 and the fourth plate 221.

Figure 10:
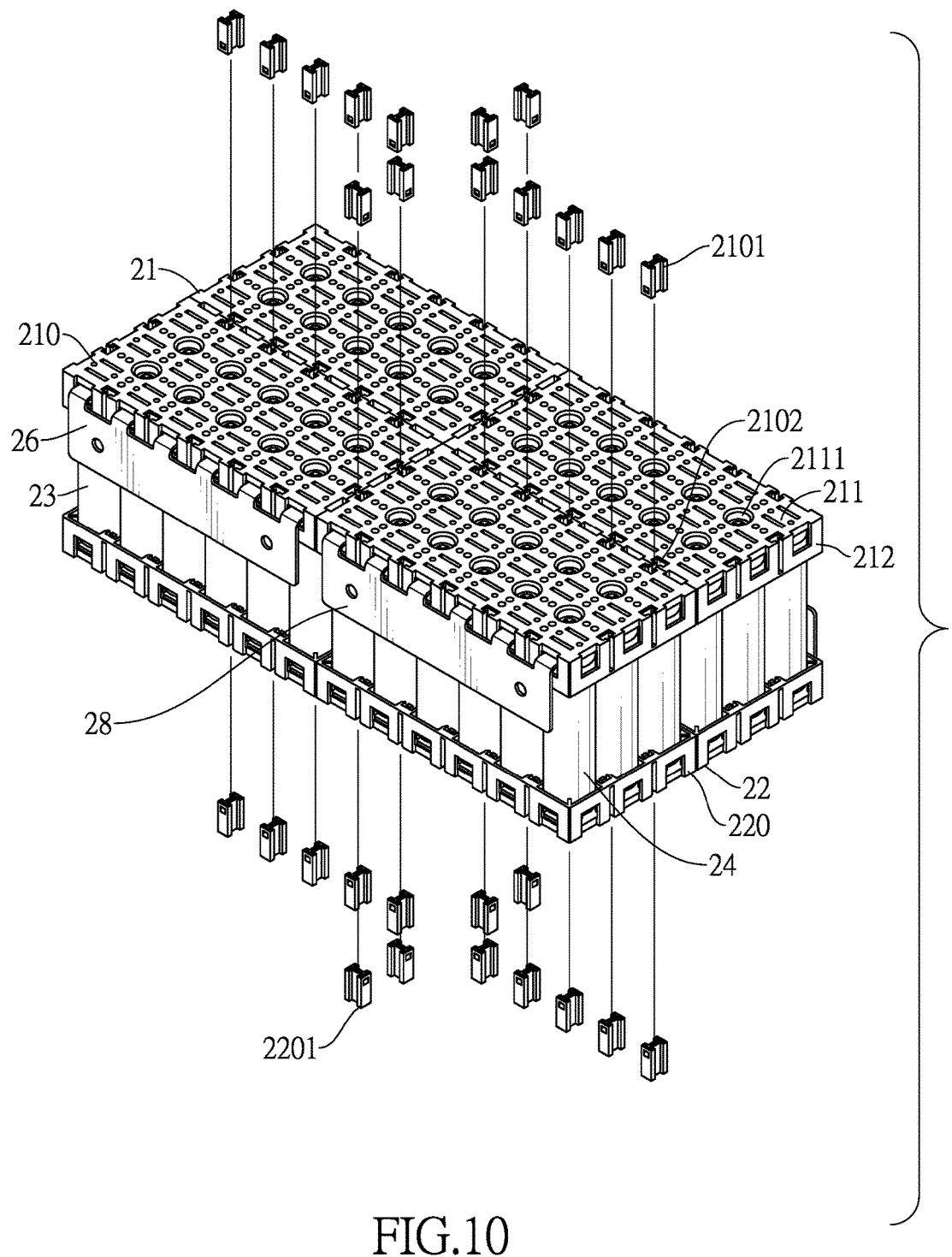
FIG. 10 is a perspective view of assembling the second embodiments of the weldingless cylindrical battery pack devices of FIG. 5.
Figure 11:
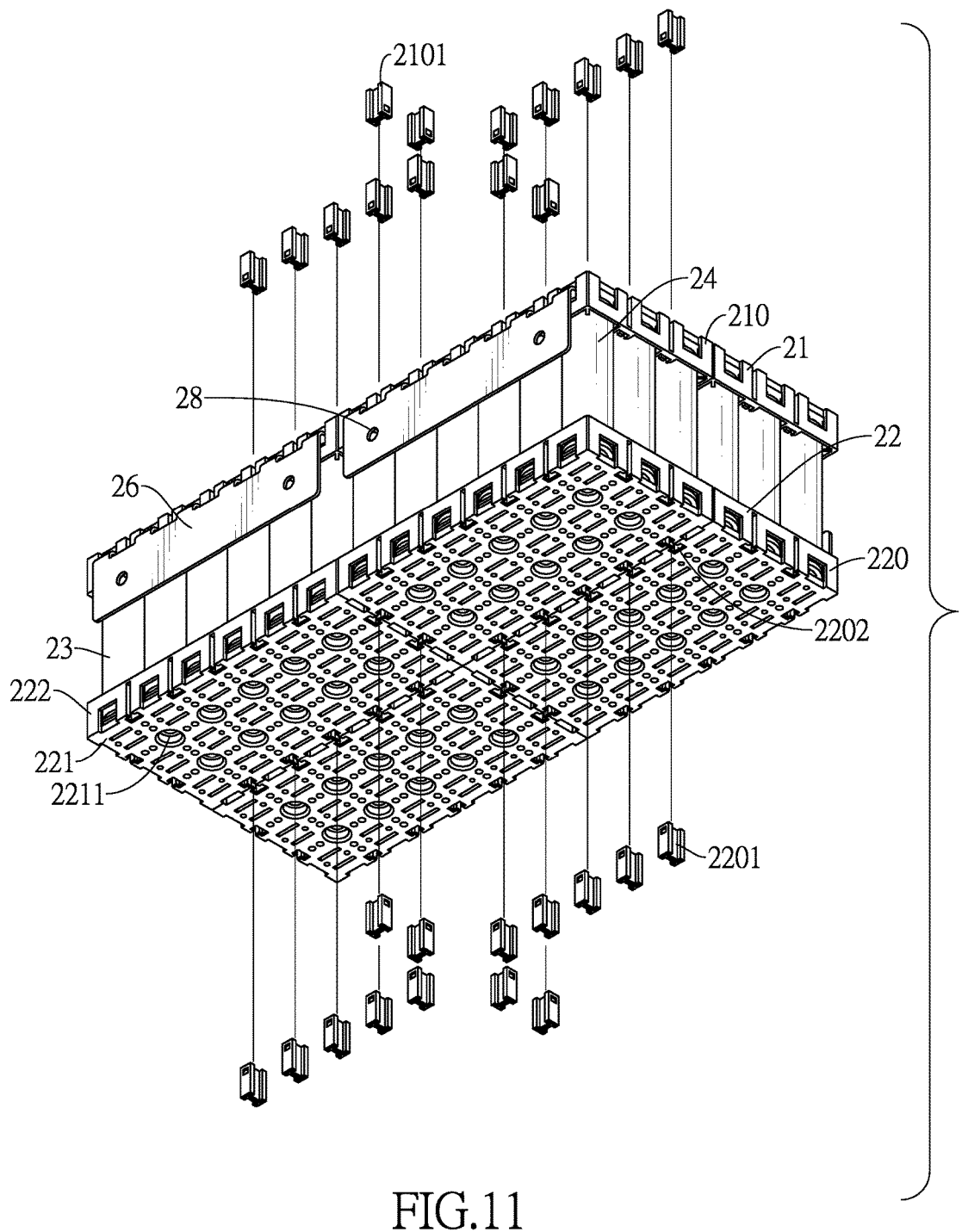
FIG. 11 is another perspective view of assembling the second embodiments of the weldingless cylindrical battery pack devices of FIG. 5.
Figure 12:
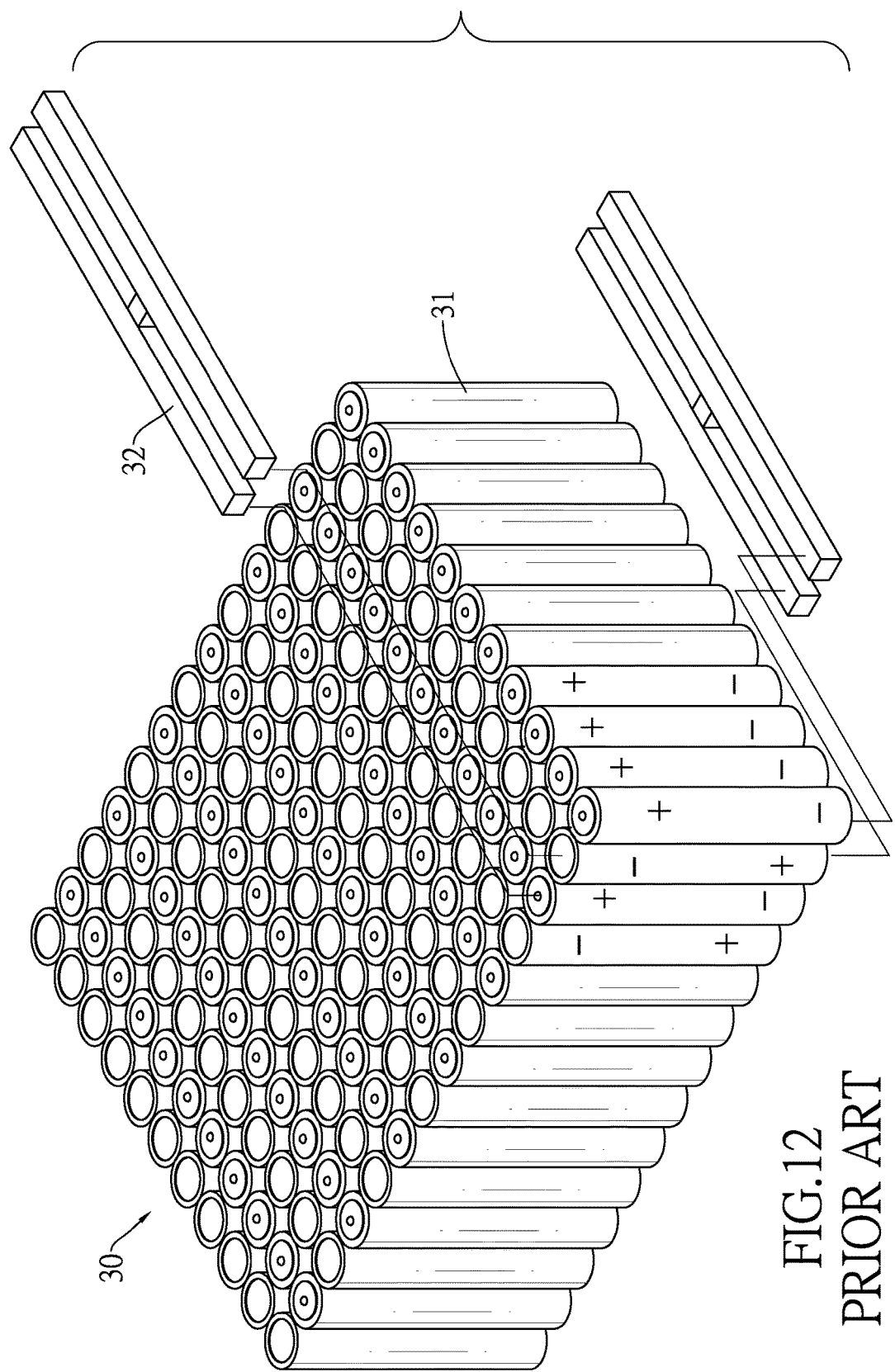
FIG. 12 is an exploded perspective view of a conventional battery pack.

With reference to FIGS. 10 and 11, the third lid body 21 comprises a plurality of third lid units 210 and a plurality of connecting units 2101. A plurality of engaging grooves 2102 are formed on edges of the third lid units 210. Two engaging grooves 2102 of two adjacent third lid units 210 are connected. Each one of the connecting units 2101 is mounted in the connected two engaging grooves 2102 of two adjacent third lid units 210. Therefore, the two adjacent third lid units 210 may be connected by the connecting units 2101. In the embodiment, the connecting units 2101 may be H-shaped.

The fourth lid body 22 comprises a plurality of fourth lid units 220 and a plurality of connecting units 2201. A plurality of engaging grooves 2202 are formed on edges of the fourth lid units 220. Two engaging grooves 2202 of two adjacent fourth lid units 220 are connected. Each one of the connecting units 2201 is mounted in the connected two engaging grooves 2202 of two adjacent fourth lid units 220. Therefore, the two adjacent fourth lid units 220 may be connected by the connecting units 2201. In the embodiment, the connecting units 2201 may be H-shaped.

The third lid body 21 consists of multiple third lid units 210, and the fourth lid body 22 consists of multiple fourth lid units 220. Therefore, size of the third lid body 21 and size of the fourth lid body 22 may be changed according to the amount of the third lid body 21 and the fourth lid body 22.

Then, the third cylindrical batteries 23 and the fourth cylindrical batteries 24 may be mounted between the third lid body 21 and the fourth lid body 22. Further, the third elastic piece 26, the fourth elastic piece 27, and the fifth elastic piece 28 may be inserted into the weldingless cylindrical battery pack device 20, and the third cylindrical batteries 23 and the fourth cylindrical batteries 24 may be electronically connected in parallel and in series. Therefore, design of the weldingless cylindrical battery pack device 20 may be easily changed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A weldingless cylindrical battery pack device, comprising:
    a first lid body, comprising:
        a first plate, having a plurality of first through holes;
        a first surrounding wall, mounted around an edge of the first plate; wherein the first surrounding wall has a plurality of first insertion holes;
        a plurality of first connecting pillars, mounted on the first plate; wherein the first connecting pillars each respectively correspond to the first through holes; wherein each one of the first connecting pillars has a first screwing hole, and the first screwing holes of the first connecting pillars are formed through the first connecting pillars; wherein the first screwing holes of the first connecting pillars each respectively communicate with the first through holes;
    a second lid body, comprising:
        a second plate;
        a second surrounding wall, mounted around an edge of the second plate; wherein the second surrounding wall has a plurality of second insertion holes;
        a plurality of second connecting pillars, mounted on the second plate; wherein each one of the second connecting pillars has a second screwing hole; wherein ends of the second connecting pillars are each respectively connected to ends of the first connecting pillars, and the second screwing holes of the second connecting pillars each respectively communicating with the first screwing holes of the first connecting pillars;
    a plurality of cylindrical batteries, mounted between the first lid body and the second lid body; wherein each one of the cylindrical batteries comprises a positive electrode and a negative electrode; wherein the positive electrodes of the cylindrical batteries face the first plate of the first lid body, and the negative electrodes of the cylindrical batteries face the second plated of the second lid body;
    a plurality of screwing elements; wherein the screwing elements are each respectively screwed into the first screwing holes of the first lid body and the second screwing holes of the second lid body;
    a first elastic piece comprising:
        a first connecting part;
        a plurality of first conductive bars, formed on an edge of the first connecting part; wherein the first conductive bars are each respectively inserted into the first insertion holes of the first surrounding wall of the first lid body; wherein the first conductive bars are electronically connected to the positive electrodes of the cylindrical batteries;
    a second elastic piece, comprising:
        a connecting part;
        a plurality of second conductive bars, formed on an edge of the second connecting part; wherein the second conductive bars are each respectively inserted into the second insertion holes of the second surrounding wall of the second lid body; wherein the second conductive bars are electronically connected to the negative electrodes of the cylindrical batteries.

2. The weldingless cylindrical battery pack device as claimed in claim 1, wherein the second plate of the second lid body comprises a plurality of second through holes, and the second through holes each respectively communicate with the second screwing holes of the second connecting pillars.

3. The weldingless cylindrical battery pack device as claimed in claim 1, wherein:
    each one of the first conductive bars of the first elastic piece is a wavy structure;
    wave crests or wave troughs of the first conductive bars of the first elastic piece are contacted with the positive electrodes of the cylindrical batteries;
    each one of the second conductive bars of the second elastic piece is a wavy structure;
    wave crests or wave troughs of the second conductive bars of the second elastic piece are contacted with the negative electrodes of the cylindrical batteries.

4. The weldingless cylindrical battery pack device as claimed in claim 1, wherein:
    the first through holes of the first lid body are arranged as a matrix;
    the first connecting pillars are arranged as a matrix;
    the second connecting pillars of the second lid body are arranged as a matrix;
    the cylindrical batteries are arranged as a matrix, and each four adjacent cylindrical batteries are around one of the second connecting pillars and the connected one of the first connecting pillars.

5. The weldingless cylindrical battery pack device as claimed in claim 1, wherein:
    the first insertion holes of the first lid body are adjacent to the first plate;
    the second insertion holes of the second lid body are adjacent to the second plate.

6. A weldingless cylindrical battery pack device, comprising:
    a first lid body, comprising:
        a first plate, having a plurality of first through holes;
        a first surrounding wall, mounted around an edge of the first plate; wherein the first surrounding wall has a plurality of first insertion holes;
        a plurality of first connecting pillars, mounted on the first plate; wherein the first connecting pillars each respectively correspond to the first through holes; wherein each one of the first connecting pillars has a first screwing hole, and the first screwing holes are formed through the first connecting pillars; wherein the first screwing holes of the first connecting pillars each respectively communicate with the first through holes;

a second lid body, comprising:
   a second plate;
   a second surrounding wall, mounted around an edge of the second plate; wherein the second surrounding wall has a plurality of second insertion holes;
   a plurality of second connecting pillars, mounted on the second plate; wherein each one of the second connecting pillars has a second screwing hole; wherein ends of the second connecting pillars are respectively connected to ends of the first connecting pillars, and the second screwing holes of the second connecting pillars each respectively communicate with the first screwing holes of the first connecting pillars;
a plurality of first cylindrical batteries, mounted between the first lid body and the second lid body; wherein each one of the first cylindrical batteries comprises a positive electrode and a negative electrode; wherein the positive electrodes of the first cylindrical batteries face the first plate of the first lid body, and the negative electrodes of the first cylindrical batteries face the second plate of the second lid body;
a plurality of second cylindrical batteries, mounted between the first lid body and the second lid body; wherein each one of the second cylindrical batteries comprises a positive electrode and a negative electrode; wherein the negative electrodes of the second cylindrical batteries face the first plate of the first lid body, and the positive electrodes of the second cylindrical batteries face the second plate of the second lid body;
a plurality of screwing elements; wherein the screwing elements are each respectively screwed into the first screwing holes of the first lid body and the second screwing holes of the second lid body;
a first elastic piece, comprising:
   a first connecting part;
   a plurality of first conductive bars, formed on an edge of the first connecting part; wherein the first conductive bars of the first elastic piece are each respectively inserted into the first insertion holes of the first surrounding wall of the first lid body, and are electronically connected to the positive electrodes of the first cylindrical batteries;
a second elastic piece, comprising:
   a second connecting part;
   a plurality of second negative conductive bars, formed on an edge of the second connecting part, and each respectively inserted into the second insertion holes of the second surrounding wall of the second lid body; wherein the second negative conductive bars are electronically connected to the negative electrodes of the first cylindrical batteries;
   a plurality of second positive conductive bars, formed on an edge of the second connecting part; wherein the second positive conductive bars are each respectively inserted into the second insertion holes of the second surrounding wall of the second lid body; wherein the second positive conductive bars are electronically connected to the positive electrodes of the second cylindrical batteries;
a third elastic piece, comprising:
   a third connecting part;
   a plurality of third conductive bars, formed on an edge of the third connecting part; wherein the third conductive bars of the third elastic piece are each respectively inserted into the first insertion holes of the first surrounding wall of the first lid body, and are electronically connected to the negative electrodes of the second cylindrical batteries.

7. The weldingless cylindrical battery pack device as claimed in claim 6, wherein the second plate of the second lid body comprises a plurality of second through holes, and the second through holes each respectively communicate with the second screwing holes of the second connecting pillars.

8. The weldingless cylindrical battery pack device as claimed in claim 6, wherein:
   each one of the first conductive bars of the first elastic piece is a wavy structure;
   wave crests or wave troughs of the first conductive bars of the first elastic piece are contacted with the positive electrodes of the first cylindrical batteries;
   each one of the second negative conductive bars of the second elastic piece is a wavy structure;
   wave crests or wave troughs of the second negative conductive bars of the second elastic piece are contacted with the negative electrodes of the first cylindrical batteries;
   each one of the second positive conductive bars of the second elastic piece is a wavy structure;
   wave crests or wave troughs of the second positive conductive bars of the second elastic piece are contacted with the positive electrodes of the second cylindrical batteries;
   each one of the third conductive bars of the third elastic piece is a wavy structure;
   wave crests or wave troughs of the third conductive bars of the third elastic piece are contacted with the negative electrodes of the second cylindrical batteries.

9. The weldingless cylindrical battery pack device as claimed in claim 6, wherein:
   the first through holes of the first lid body are arranged as a matrix;
   the first connecting pillars are arranged as a matrix;
   the second connecting pillars of the second lid body are arranged as a matrix;
   the first cylindrical batteries and the second cylindrical batteries are arranged as a matrix, and each four adjacent first cylindrical batteries and second cylindrical batteries are around one of the second connecting pillars and the connected one of the first connecting pillars.

10. The weldingless cylindrical battery pack device as claimed in claim 6, wherein:
   the first insertion holes of the first lid body are formed on a position on the first surrounding wall near a boundary between the first surrounding wall and the first plate;
   the second insertion holes of the second lid body are formed on a position of the second surrounding wall near a boundary between the second surrounding wall and the second plate.

11. The weldingless cylindrical battery pack device as claimed in claim 6, wherein the first lid body comprises:
   a plurality of first lid units; wherein edges of the first lid units have a plurality of engaging grooves, and two of the engaging grooves of two adjacent ones of the first lid units are connected;
   a plurality of connecting units; wherein each one of the connecting units is mounted in the connected two engaging grooves of the two adjacent ones of the first lid units.

12. The weldingless cylindrical battery pack device as claimed in claim 11, wherein the connecting units are H-shaped.

13. The weldingless cylindrical battery pack device as claimed in claim 6, wherein the second lid body comprises:
- a plurality of second lid units; wherein edges of the second lid units have a plurality of engaging grooves, and two of the engaging grooves of two adjacent ones of the second lid units are connected;
- a plurality of connecting units; wherein each one of the connecting units is mounted in the connected two engaging grooves of the two adjacent second lid units.

14. The weldingless cylindrical battery pack device as claimed in claim 13, wherein the connecting units are H-shaped.

\* \* \* \* \*